United States Patent Office 3,560,478
Patented Feb. 2, 1971

3,560,478
ANALOGUES OF NUCLEOSIDE PHOSPHATES
Terrell C. Myers, 2571 E. 71st St.,
Chicago, Ill. 60649
No Drawing. Continuation-in-part of application Ser. No. 526,041, Feb. 9, 1966. This application June 14, 1968, Ser. No. 746,723
Int. Cl. C07d $51/52, 51/54$
U.S. Cl. 260—211.5
3 Claims

ABSTRACT OF THE DISCLOSURE

Phosphonate derivatives of base-sugar phosphates having the formulae:

Monophosphonates:

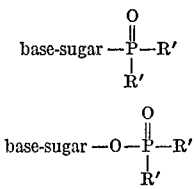

Diphosphonates:

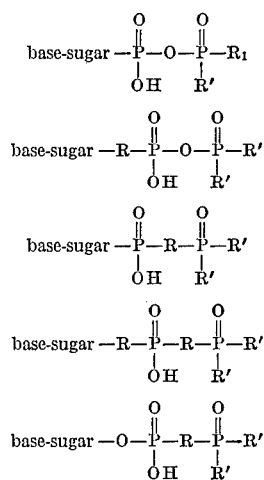

Triphosphonates:

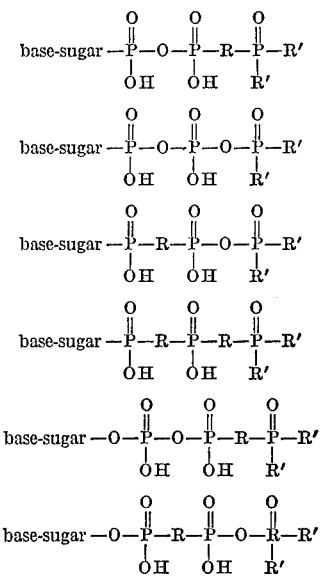

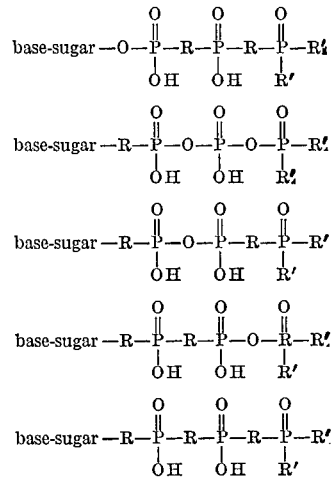

in which at least one of the R' groups is selected from the group consisting of R" and OR" in which R" is a monovalent organic group selected from the group consisting of a lower aliphatic group and halogen derivatives thereof, a fatty acid group and halogenated derivatives thereof, an aryl group and halogenated derivatives thereof, an alkaryl group and halogenated derivatives thereof, a heterocyclic group and a base sugar group and in which the base is selected from the group consisting of a purine base and a pyrimidine base.

---

This is a continuation-in-part of my copending application Ser. No. 526,041, filed Feb. 9, 1966, and entitled "Analogues of Nucleoside Phosphates," now abandoned.

This invention relates to derivatives of phosphonic acid analogues of nucleoside phosphates and to the method of manufacture of same. It relates more particularly to derivatives of phosphonic acid analogues of nucleoside monophosphates, diphosphates and triphosphates in which one or more of the bridging oxygens of the phosphate or pyrophosphate are replaced by a methylene or other aliphatic $C_1$ to $C_4$ group.

It is an object of this invention to produce and to provide a method for producing derivatives of phosphonic acid analogues of nucleoside phosphates and it is a related object to produce and to provide a method for producing derivatives of phosphonic acid analogues of nucleoside monophosphonates, diphosphonates and triphosphonates in which one or more of the bridging oxygens are replaced by a short chained alkylene group.

In my application Ser. No. 223,527, now Pat. No. 3,238,191, which was copending with my parent application Ser. No. 526,041, description is made of the production of a new series of compounds described as phosphonic acid analogues of nucleoside phosphates in which at least one of the bridging oxygen groups of the phosphates or pyrophosphates are replaced by an alkylene group, as represented by the following mono-, di- and triphosphates:

Phosphonic acid analogues of monophosphates:

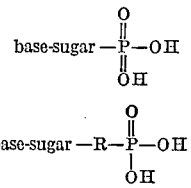

Phosphonic acid analogues of diphosphates:

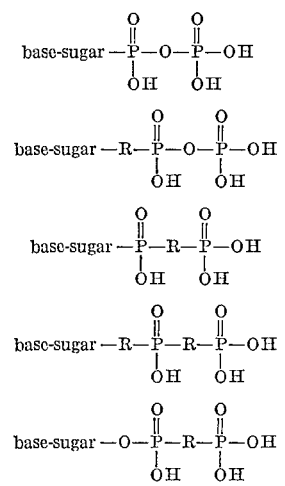

Phosphonic acid analogues of triphosphates:

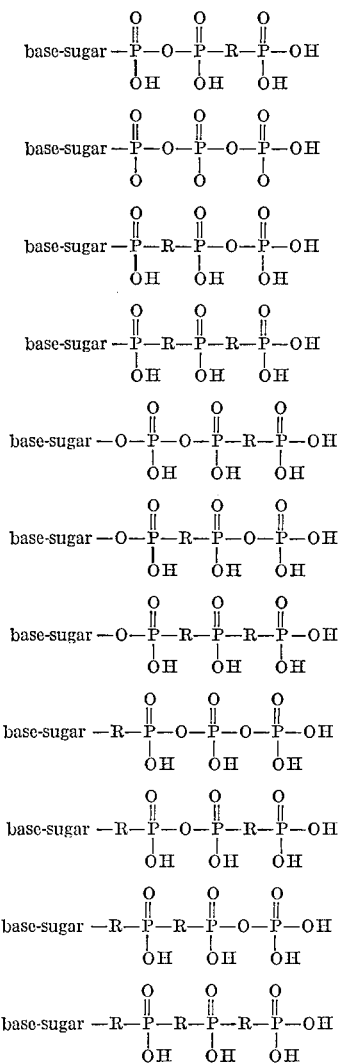

where R is an organic alkylene group and wherein the sugar-P and sugar —R—P indicate a direct C—P bond.

The concepts of this invention are addressed to the preparation of phosphonate derivatives of such base-sugar phosphates of the type described having the general formula:

Monophosphonates:

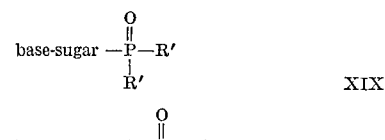

Diphosphonates:

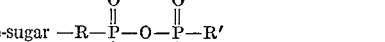
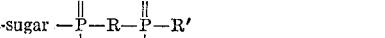
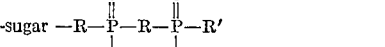
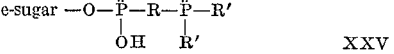

Triphosphonates:

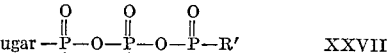
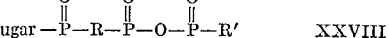
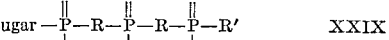
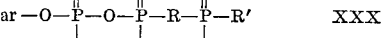
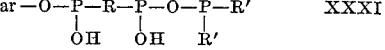
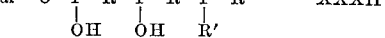
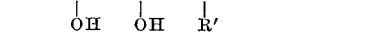
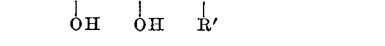
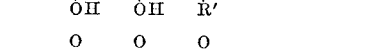

in which R is an alkylene group having from 1 to 4 carbon atoms; in which at least one or both of the R' groups is R'' or OR'' while if only one of the R' groups is R'' or OR'', the other remains hydroxyl and in which R'' is a monovalent organic group such as methyl, ethyl, propyl, ethenyl, propenyl and the like saturated or unsaturated lower aliphatic group or halogenated derivative thereof; decanyl, dodecanyl, stearyl and the like saturated or unsaturated fatty acid group and halogenated derivatives thereof; benzyl, naphthyl, and the like aromatic or halogenated derivative thereof; tolyl and the like alkaryl group and derivative thereof; furfuryl, pyridyl, furanyl, quinoyl, thiophenyl and the like heterocyclic group and derivative thereof; or in which R'' is a base sugar group.

As in my aforementioned Pat. No. 3,238,191, the term "base" refers to the purine or pyridine bases of natural nucleoside phosphates. Representative of pyrimidine bases are uracil, thymine, cytosine, 5-methylcytosine, and 5-hydroxymethylcytosine. Representative of the purine bases are adenine, quanine, hypoxanthine, xanthine, and uric acid.

The sugars which attach to the bases to form the corresponding nucleosides comprise the pentoses joined with the bases in forming the glucosides and the corresponding nucleosides are ribose and desoxyribose.

The base and the sugars are joined between the nitrogen groups in the 9 position of the purine base and in the 3 position of the pyrimidine base by condensation with the $\beta$-hydroxy group in the $C_1$ position of the sugar as represented by the following:

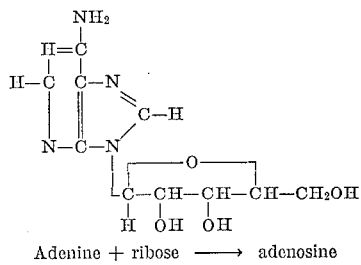

Adenine + ribose ⟶ adenosine

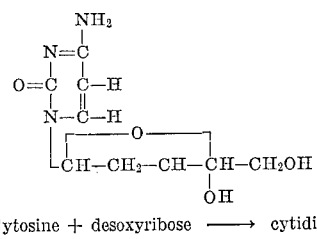

Cytosine + desoxyribose ⟶ cytidine

The phrosphonic or phosphoric acid attaches to the sugar in the formulation of the nucleoside through one or more of the hydroxyl groups in the $C_2$, $C_3$ or $C_5$ position of ribose or the $C_3$ or $C_5$ postion of desoxyribose to form the corresponding 2', 3' or 5' phosphonate or combinations thereof.

As used herein, the term "base-sugar" shall refer to the various nucleosides that are formed by the described bases with the described sugars.

In accordance with the practice of this invention, the derivatives of the phosphonic acid analogue of the mono-, di- and triphosphonate are prepared by the reaction in the presence of a condensing agent such as dicyclohexylcarbodiimide or trichloroacetonitrile of:

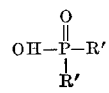 A or

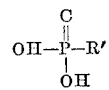 B with the base-sugar to form the corresponding base-sugar monophosphonates as represented by base sugar OH+A→ (Formula XX) or with the base sugar monophosphate such as Formula I or Formula II to form the corresponding diphosphonates as represented by the Formulae XXII and XXIII or with the base sugar diphosphates, as represented by the Formulae III, IV, V, VI and VII to form the corresponding triphosphates, as represented by the Formulae XXVII, XXVIII, XXXI, XXXIII and XXXV.

Such reactions can be carried out with the procedure identified in my aforementioned application as Synthesis I or Synthesis II, of which the following are representative:

EXAMPLE 1

Preparation of adenosine 5'-methylphosphonate-(R=—CH₃)

Methylphosphonic acid (5 g., 0.052 mole) and isopropylidine-adenosine (8 g., 0.26 mole) were dissolved in dry pyridine (50 ml.) and the solution was evaporated to dryness on a rotary evaporator at 30°/1 mm. This procedure was repeated three times to assure a dry reaction mixture. The residue was dissolved in dry pyridine (100 ml.), dicyclohexylcarbodiimide (21.2 g., 0.104 mole) was added and the solution was allowed to stand overnight at 35°. The mixture was diluted with water (100 ml.) and the solid was filtered off and washed thoroughly with water. The combined filtrate and washings were extracted three times with ether and the aqueous solution was evaporated to dryness on a flash evaporator at 30°/20 mm. Water was added and the solution was again evaporated to dryness. This procedure was repeated until no odor or pyridine could be detected.

The solid was dissolved in acetic acid (150 ml., 10%), the solution was heated at 100° for one and one-half hours and then evaporated to dryness on the rotary evaporator at 30°/20 mm. The solid residue was redissolved in water and the solution was again evaporated to dryness. The residual white solid was dissolved in water (30 ml.), the insoluble material was filtered off, ethanol (75 ml.) was added to the clear filtrate and the solution was allowed to stand overnight at room temperature. The crystalline precipitate was filtered and washed with ethanol (8.3 g., 86%; M.P. 180–1° dec.). The product showed a single spot on paper chromatography; solvent system A, $R_f$ 0.77; solvent system B, $R_f$ 0.52.

*Analysis.*—Calcd. for $C_{10}H_{16}O_6N_5P \cdot \frac{1}{2}H_2O$ (percent): C, 37.30; H, 4.83; N, 19.74; P, 8.48. Mol. wt. 344. Found (percent): C, 37.30; H, 4.72; N, 19.87; P, 8.46 Equiv. wt. (by ultraviolet absorption measurements), 346.6.

EXAMPLE 2

Preparation of adenosine 5'-ethylphosphonate (R=—CH₂CH₃)

Ethylphosphonic acid (4.6 g., 0.041 mole) and isopropylideneadenosine (6.5 g., 0.031 mole) were dissolved in dry pyridine (50 ml.) and the solution was evaporated to dryness on a rotary evaporator at 30°/1 mm. This procedure was repeated three times to assure a dry reaction mixture. The residue was dissolved in dry pyridine (100 ml.), dicyclohexylcarbodiimide (17.3 g., 0.084 mole) was added and the clear solution was allowed to stand overnight at 35°. The mixture was diluted with water (100 ml.) and the solid was filtered off and washed thoroughly with water. The combined filtrate and washings were extracted three times with ether and the aqueous solution was evaporated to dryness on a flash evaporator at 30°/20 mm. Water was added and the solution was again evaporated to dryness. This procedure was repeated until no odor of pyridine could be detected.

The solid was dissolved in acetic acid (150 ml., 10%), the solution was heated at 100° for 45 minutes and then evaporated to dryness on the rotary evaporator at 30°/20 mm. The solid residue was redissolved in water and this solution again evaporated to dryness. The residual white solid was dissolved in water (40 ml.), the insoluble material was filtered off, ethanol (50 ml.) was added to the clear filtrate and the cloudy mixture was allowed to stand at room temperature. The crystalline precipitate was filtered off and washed with ethanol (4.7 g., 54%); (M.P. 193–4°). The product showed a single spot upon paper chromatography: solvent system A, $R_f$ 0.70; solvent system B, $R_f$ 0.80.

*Analysis.*—Calcd. for $C_{11}H_{16}O_6N_5P \cdot \frac{1}{2}H_2O$ (percent): C, 39.13; H, 5.20; N, 19.02; P, 8.41. Mol. wt., 368.3. Found (percent): C, 39.30; H, 5.46; N, 18.91; P, 8.32. Equiv. wt. (by ultraviolet absorption measurements), 361.4.

In the foregoing examples, any one of the base sugars previously described can be substituted in equivalent amounts for the isopropylidineadenosine. Similarly, phosphonic acids having the methyl or ethyl groups substituted with others of the organic groups previously described for R" can be substituted for the methylphosphonic acid or ethylphosphonic acid in the foregoing examples and the phosphonic acid having an ethyl, methyl, or other organic group substituted for an additional hydroxyl group can be substituted for the methylphosphonic acid or the ethylphosphonic acid to produce the corresponding disubstituted derivative.

To prepare the derivatives where R' is a base sugar, it is preferred to react the base sugar in the presence of a condensing agent of the type described with an alkylene diphosphonic acid such as

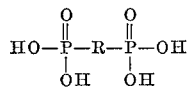

or an alkylene triphosphonic acid such as

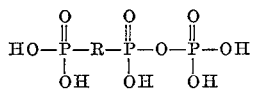

or

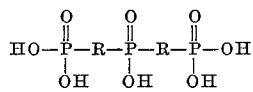

in which R is an alkylene group having from 1 to 4 carbon atoms such as methyl, ethyl, propyl, butyl, etc. to produce the corresponding products

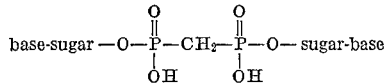

or

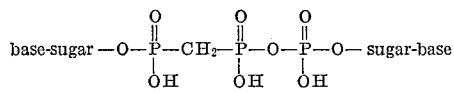

or

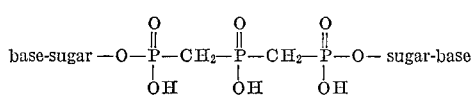

The following is typical of the reaction:

EXAMPLE 3

Preparation of $P^1,P^2$-diadenosine-5' methylenediphosphonate

Methylenediphosphonic acid (10 g., 60 mmoles) and 2',3'-isopropylideneadenosine (12.48 g., 40 mmoles) were dissolved in dimethylformamide (130 ml.) containing tri-n-hexylamine (9.32 g. 35 mmoles). Trichloracetonitrile (80 ml., 800 mmoles) was added and the mixture was stirred until a clear solution was obtained. The solution was heated (70–80°) with stirring for three hours during which time a small amount of solid precipitated and the solution developed a yellow color. The reaction mixture was cooled to room temperature, the insoluble material filtered off with suction and the yellow filtrate was concentrated on a flash evaporator to a volume of 130 ml. The solid which precipitated on evaporation was filtered off and the filtrate was treated with sulfuric acid (5 N, 360 ml.) in a separatory funnel. The resulting mixture separated into two phases upon standing overnight (12 hours) at room temperature. The bottom phase was heavy brown oil while the top phase (aqueous) was essentially colorless. The oil layer was separated and extracted with water (three times, a total of 100 ml.), the water washings were added to the aqueous (top) layer and the total solution diluted to one liter. This solution contained 280,000 O.D. units (at 260 m$\mu$) corresponding to 18 mequivs. of adenine-containing compounds.

The solution was treated with acid washed charcoal (Norite-A) (100 g.) in four parts. During this treatment the optical density of the solution dropped to 2.5. The Norite was thoroughly washed with water (ca. 15 liters) until no precipitation was observed upon treatment of the washings with aqueous silver nitrate solution. Elution from the charcoal was accomplished using 10% concentrated ammonium hydroxide (by volume) in 50% ethanol in one liter batches. A total of ten liters of the eluate solution was used. The combined eluates were evaporated on a rotary evaporator at 30° to 500° ml. and then filtered to remove traces of charcoal. This gave a slightly yellow solution (total O.D. units, 186,000).

The solution was further concentrated to 20 ml., made basic (pH 8–9) with 10 N sodium hydroxide and then passed through a column of Dowex-1 ion-exchange resin (formate form, 2% cross linked, 5 x 60 cm.) at a rate of about 1 ml. per minute. After washing the column with water, (3000 ml., total O.D. units 54,000) fractionation was carried out at a rate of 4 ml. per minute using 6 N formic acid as the eluting medium. Ten milliliter fractions were collected. The optical density of each fraction was determined at 260 m$\mu$. Two major ultraviolet absorbing peaks were obtained: Peak I, fractions 71–79, total optical density units 10,000; Peak II, fractions 108–204, total optical density units 98,000.

The solution containing peak II was evaporated on a rotary evaporator at 30°/20 mm. to a white solid. The solid was dissolved in water and the solution again evaporated in order to remove traces of formic acid. This procedure was repeated three times. The solid was again dissolved in water and lyophilized to a white powder which was recrystallized from water as clusters of colorless needles (3.1 g., 18%; M.P. 203–5° dec.).

*Analysis.*—Calcd. for $C_{11}H_{17}N_5O_9P_2$ (percent): C, 31.06; H, 4.04; N, 16.46; P, 14.57. Mol. wt. 425.3; adenine: strong acid: weak acid, 1:2:1. Found (percent): C, 30.93; H, 4.15; N, 16.66; P, 14.77; equiv. wt. (by ultraviolet absorption measurements), 410.6; mol. wt. (from titration data) 422.5 (pK's 4.00, 8.15); adenine: strong acid: weak acid, 1:2:1.

Titration under similar conditions of a solution of ADP prepared by treating a solution of monosodium ADP (Pabst Laboratories) with Dowex 50 (H) ion-exchange resin gave adenine: strong acid: weak acid, 1:2:1 (pK's 4.20, 7.10).

Paper chromatography of the product gave single clean spots: solvent system A, $R_f$ 0.77, $R_{ADP}$ 0.96; solvent system B, $R_f$ 0.52, $R_{ADP}$ 1.15. The product gave a positive reaction when the chromatograms were sprayed with periodate-benzidine spray.

EXAMPLE 4

Preparation with dicyclohexylcarbodiimide

A mixture of methylenediphosphonic acid (2.80 g., 16 mmoles), freshly distilled anhydrous pyridine (200 ml.) and tri-n-butylamine (28 ml.) was heated at 60° with stirring until a clear solution was obtained. After cooling to room temperature, isopropylideneadenosine (1.24 g., 4 mmoles) and dicyclohexylcarbodiimide (13 g., 64 mmoles) were added. The resulting solution was heated at 60° for 14 hours with stirring with the careful exclusion of moisture. The reaction mixture (white precipitate plus supernatant liquid) was evaporated on the flash evaporator at 35° to a gummy solid. This material was treated with 50 ml. of water and the insoluble white solid was filtered off and washed with four 20 ml. portions of water. The filtrate and washings were combined and extracted with five 100 ml. portions of ether. The aqueous solution was concentrated to dryness on a flash evaporator at 30°. This process was repeated three times. Finally the residual syrup was dissolved in 30 ml. of water and the solution was lyophilized to produce a yellow solid. The solid was dissolved in 100 ml. of 10% acetic acid and the solution was heated for one hour on the steam bath and then concentrated to dryness by use of the flash evaporator at 30°. The residue was dissolved in 30 ml. of water and the solution concentrated to dryness. This procedure was repeated for a total of four times.

The residue was dissolved in 30 ml. of water and the solution was adjusted to pH 8–9 with 1 N $H_4OH$ and applied to a Dowex-2 (formate form, X–8) ion-exchange column (4.5 x 13 cm). The column was washed with 1 liter of water and then with 1 liter of 0.1 N formic acid. Elution was carried out by a linear gradient technique with 1 liter of 0.1 N formic acid in the mixing chamber and 2 liters of 0.5 N formic acid in the reservoir, at a flow rate of about 1.5 ml./min., with 15 ml. fractions being collected. Fractionation was followed by ultraviolet-absorbancy measurements at 260 m$\mu$. A single major ultraviolet-absorbing fraction was obtained (in addition to a very small fraction near the start of the elution which was discarded). This fraction (I) occurred at tubes 113–165 and contained 11,500 O.D. units. After the eluting system described above was exhausted, elution was continued with 1 liter of 0.5 N formic acid in the mixing chamber and 3 liters of 1.2 N formic acid in the reservoir. This produced a single fraction (II) tubes 160–232 (numbered from start of new elution) which contained 39,000 O.D. units.

Fraction II on paper chromatography produced single spots in solvent systems A and B with $R_f$s essentially identical to those given by adenosine 5'-methylenediphosphonate prepared by the trichloroacetonitrile method. The fraction was concentrated on the flash evaporator to a white solid which was dissolved in a minimum of water and the solution was lyophilized. This last procedure was repeated to give 1.26 g. (74%) of adenosine 5'-methlenediphosphonate as a clean white solid. This material was recrystallized from water (4 ml.) as clusters of colorless needles; (1.05 g., 61%; M.P. 203–4° dec., 203–4° dec.) when admixed with a sample prepared by the trichloroacetonitrile method. The product produced single spots on paper chromatography solvent systems A and B with $R_f$s essentially identical to those given by a sample prepared by the trichloroacetonitrile method; solvent system A, $R_f$ 0.77, $R_{ADP}$ 0.96; solvent system B, $R_f$ 0.53, $R_{ADP}$ 1.15.

*Analysis.*—Calcd. for $C_{11}H_{17}N_5O_9P_2$: mol. wt., 425.3. Found: mol. wt. (from titration data), 428 (P$k_A'$ 3.90, 8.15), equiv. wt. (by ultraviolet absorption measurements), 429.

EXAMPLE 5

Preparation of the tricyclohexylammonium salt of adenosine 5'-methylenediphosphonate Adenosine 5'-methylene-diphosphonate (80 mg.) was dissolved in 2 ml. of water. Cyclohexylamine (to pH 8) was added and the clear solution was lyophilized to a white powder. Tricyclohexylammonium adenosine 5'-methlenediphosphonate was then crystallized from 95% ethanol to give colorless needles (40 mg., M.P. 156–157°).

*Analysis.*—Calcd. for $C_{29}H_{59}N_8O_9P_2$ (percent): C, 47.01; H, 7.91; N, 15.13; P, 8.36; Found (percent): C, 47.18; H, 8.10; N, 15.07; P, 8.66.

Paper chromatograms of the salt gave single clean spots with $R_f$s essentially identical to those given by the free acid: solvent system A, $R_f$ 0.77; solvent system B, $R_f$ 0.52.

Fraction II was concentrated on the flash evaporator to a white solid. This material was dissolved in a minimum of water and the solution was lyophilized. This last procedure was repeated three times to give $R^1$, $P^2$-diadenosine-5' methylenediphosphonate (Ad-PCP-Ad) as the dihydrate. Yield, 310 mg. (10.8%).

*Analysis.*—Calcd. for $C_{21}H_{28}N_{10}O_{12}P_2 \cdot 2H_2O$ (percent): C, 35.49; H, 4.51; N, 14.71. Found (percent): C, 34.70; H, 4.92; N, 20.03.

In each of the Examples 3 and 4, the Fraction I contains the product $P^1$, $P^2$-diadenosine-5'-methylenediphosphonate.

Other base sugars can be substituted in equivalent amounts for the 2',3' isopropylideneadenosine in Examples 3 and 4 to produce the corresponding base sugar derivatives.

As described in Pat. No. 3,238,191, utility exists in the fact that since many of the established reactions of nucleoside phosphates are those of formation or cleavage of the phosphate linkages, syntheses of nucleoside polyphosphates such as the mono-, di- and triphosphates having one or more of the ester or pyrophosphate oxygen atoms replaced by a methylene or other aliphatic function are of particular interest because of the greater stability of the methylene tie-in of the phosphonates. The phosphonic acid analogues of the nucleoside phosphates prepared in accordance with the practice of this invention have been found to have physical and chemical properties similar to those of the parent phosphates or polyphosphates with the exception that the C—P bonds are extremely resistant to cleavage.

By way of a specific illustration of utility, it is known that the natural members of the adenosine series, namely, adenosine monophosphate, adenosine diphosphate, and adenosine triphosphate, produce a lowering of blood pressure in the cat anesthetized with nembutal. In this series, as the number of phosphate groups is increased, the blood pressure lowering effect is also increased. The relationship between the activity and the number of phosphate groups in the 5' position seems to suggest participation of the phosphate side chain in the mechanism which produces the blood pressure response.

The P—C bond of the phosphonic acid analogue is stable by comparison with that of adenosine triphosphate and thus resists cleavage in the organism while the O—P bond of the phosphate is labile and easily hydrolyzed.

The analogue is sufficiently similar to the parent cofactor adenosine triphosphate to act as an inhibitor in the processes involving cleavage of the terminal pyrophosphate bond of adenosine triphosphate, or as an alternate substrate in processes involving cleavage of the second pyrophosphate bond, or as an alternate substrate in processes involving complex formation as with metal ions in which no cleavage of pyrophosphate bonds occurs.

It is believed that the mechanism of the improved action of the analogues embodying the features of this invention may be due to binding to the receptor site or to a metal without cleavage of the chain. The greater activity of the analogue might also be accounted for by reason of a decreased rate of destruction or to a greater affinity for the receptor site.

The replacement of the terminal pyrophosphate oxygen of ATP with a methylene function has been found to result in a compound having considerably greater blood pressure lowering properties than ATP. The increase in activity may be related to an increased binding of the compound to receptor sites or to a metal as the methylene group is substituted for the pyrophosphate oxygen of the naturally occurring compound.

It will be understood that changes may be made in the details of formulation and reaction without departing from the spirit of the invention, especially as defined in the following claims.

I claim:
1. A phosphonic acid analogue of a nucleoside phosphonate consisting of the analogues of a monophosphonate selected from the group consisting of:

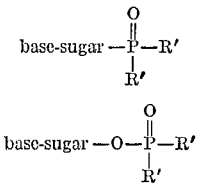

in which at least one of the groups R' is selected from the group consisting of R" and OR", if only one of the groups R' is R" or OR" the other is hydroxyl, and in which R" is a monovalent organic group selected from the group consisting of an aliphatic group having from 1 to 18 carbon atoms, an aryl group, alkaryl group, a heterocyclic group and a base-sugar group and in which the base is selected of the group consisting of a purine base and a pyrimidine base.

2. A phosphonic acid analogue of a nucleoside diphosphonate selected from the group consisting of:

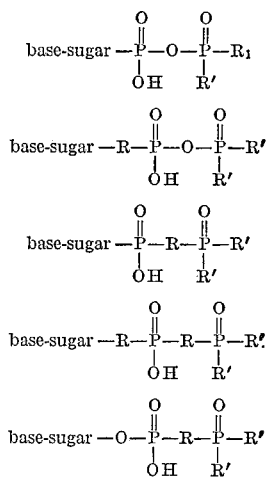

in which R is an organic alkylene group of from 1 to 4 carbon atoms, wherein the sugar —P and —R—P— indicates a direct C—P bond and in which at least one of the groups R' is selected from the group consisting of R" and OR", if only one of the groups R' is R" or OR" the other is hydroxyl, and in which R" is a monovalent organic group selected from the group consisting of an aliphatic group having from 1 to 18 carbon atoms, an aryl group, an alkaryl group, a heterocyclic group and a base-sugar group and in which the base is selected of the group consisting of a purine base and a pyrimidine base.

3. A phosphonic acid analogue of a nucleoside triphosphonate consisting of the analogues of a triphosphonate selected from the group consisting of:

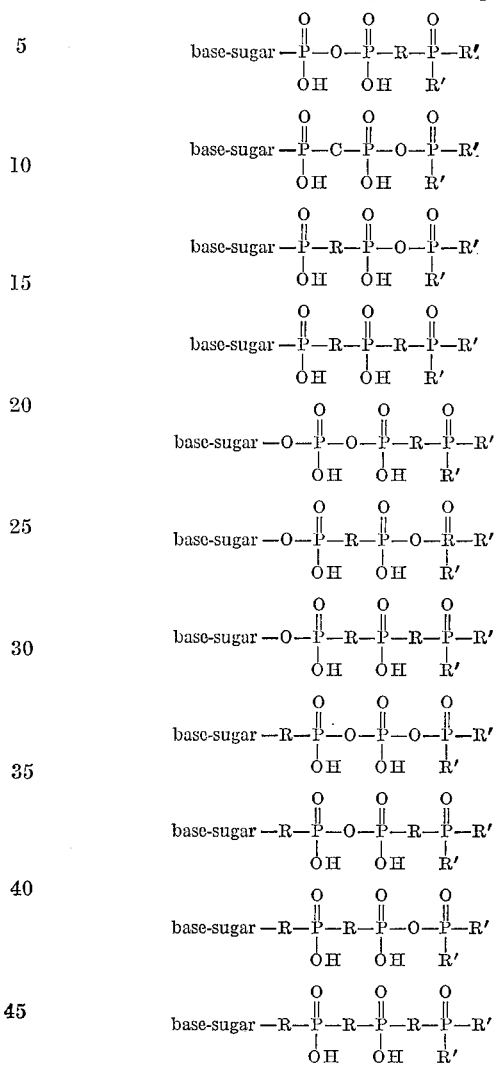

in which R is an organic alkylene group of from 1 to 4 carbon atoms, wherein the sugar —P and —R—P— indicates a direct C—P bond and in which at least one of the groups R' is selected from the group consisting of R" and OR", if only one of the groups R' is R" or OR" the other is hydroxyl, and in which R" is a monovalent organic group selected from the group consisting of an aliphatic group having from 1 to 18 carbon atoms, an aryl group, an alkaryl group, a heterocyclic group and a base-sugar group and in which the base is selected of the group consisting of a purine base and a pyrimidine base.

References Cited

UNITED STATES PATENTS 3,238,191   3/1966   Myers _____ 260—211.5

LEWIS GOTTS, Primary Examiner

J. R. BROWN, Assistant Examiner

U.S. Cl. X.R.

260—999